(12) United States Patent
Ahrens

(10) Patent No.: US 8,747,059 B2
(45) Date of Patent: Jun. 10, 2014

(54) SUPERCHARGER DEVICE

(75) Inventor: Thomas Ahrens, Knesebeck (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 950 days.

(21) Appl. No.: 12/864,009

(22) PCT Filed: Jan. 9, 2009

(86) PCT No.: PCT/EP2009/050201
§ 371 (c)(1),
(2), (4) Date: Jul. 22, 2010

(87) PCT Pub. No.: WO2009/092635
PCT Pub. Date: Jul. 30, 2009

(65) Prior Publication Data
US 2010/0290895 A1    Nov. 18, 2010

(30) Foreign Application Priority Data
Jan. 23, 2008    (DE) .......................... 10 2008 005658

(51) Int. Cl.
*F04D 29/56* (2006.01)
(52) U.S. Cl.
USPC ....................................................... 415/160
(58) Field of Classification Search
USPC .............. 415/151, 152.2, 155–160, 163–166, 415/191, 208.1, 208.2, 208.3
See application file for complete search history.

(56) References Cited

U.S. PATENT DOCUMENTS

| | | | |
|---|---|---|---|
| 5,207,565 A | 5/1993 | Roessler | |
| 5,857,337 A | 1/1999 | Kawasaki | |
| 6,401,563 B1 | 6/2002 | Franklin | |
| 7,371,047 B2 * | 5/2008 | Burmester et al. | 415/204 |
| 7,794,200 B2 * | 9/2010 | Mukherjee | 415/164 |
| 8,172,500 B2 * | 5/2012 | Fleig et al. | 415/55.3 |
| 2006/0207253 A1 * | 9/2006 | Sumser et al. | 60/602 |
| 2010/0196146 A1 * | 8/2010 | Wengert et al. | 415/163 |
| 2010/0316489 A1 | 12/2010 | Hoecker et al. | |
| 2011/0236197 A1 * | 9/2011 | Burmeister et al. | 415/204 |

FOREIGN PATENT DOCUMENTS

| | | | |
|---|---|---|---|
| DE | 3844189 A1 | 7/1990 | |
| DE | 19708000 A1 | 9/1997 | |
| DE | 10325649 A1 | 12/2004 | |
| DE | 10325985 A1 | 12/2004 | |
| DE | WO 2004109063 | * 12/2004 | 415/164 |
| DE | 10337495 A1 | 3/2005 | |
| DE | 69822403 T2 | 3/2005 | |
| DE | 102004023214 A1 | 12/2005 | |

(Continued)

OTHER PUBLICATIONS

English abstract for DE-102004023214, Print date: Jul. 16, 2010.

(Continued)

*Primary Examiner* — Nathaniel Wiehe
*Assistant Examiner* — Woody A Lee, Jr.
(74) *Attorney, Agent, or Firm* — Rader, Fishman & Grauer PLLC

(57) ABSTRACT

An exhaust gas supercharger, having at least one of a variable turbine and a compressor; and a vane mounting ring with at least one guide vane rotatably mounted thereon, wherein the vane mounting ring is connected to a supercharger bearing housing by at least two rivets.

18 Claims, 2 Drawing Sheets

(56) References Cited

FOREIGN PATENT DOCUMENTS

| DE | 102004033884 A1 | 2/2006 |
| DE | 102004044703 A1 | 3/2006 |
| DE | 102007040679 A1 | 3/2009 |
| DE | 102007056154 A1 | 5/2009 |
| EP | 1676980 A1 | 7/2006 |
| WO | WO-2004099573 A1 | 11/2004 |
| WO | WO-2007/018528 A1 | 2/2007 |

OTHER PUBLICATIONS

English abstract for DE-102004033884, Print date: Jul. 16, 2010.
English abstract for DE-102004044703, Print date: Jul. 16, 2010.
English abstract for DE-10325985, Print date: Jul. 16, 2010.
English abstract for DE-10337495, Print date: Jul. 16, 2010.
English abstract for DE-3844189, Print date: Jul. 16, 2010.
English abstract for DE-102007040679, Print Date: Apr. 4, 2011.
German Search Report for DE-102008005658.8, Print date: Oct. 13, 2010.

* cited by examiner

SUPERCHARGER DEVICE

CROSS-REFERENCES TO RELATED APPLICATIONS

This application claims priority to German application DE 10 2008 005 658.8 filed on Jan. 23, 2008, and PCT EP/2009/050201 filed on Jan. 9, 2009, both of which are hereby incorporated by reference in their entirety.

TECHNICAL FIELD

The present invention relates to supercharger device, in particular an exhaust gas turbocharger for a motor vehicle according to the preamble of claim 1. The invention relates also to an internal combustion engine for a motor vehicle equipped with such a supercharger device.

BACKGROUND

Exhaust gas turbochargers serve in general for increasing the power of piston engines by allowing an increase of the air flow rate and thus an increase of the fuel rate per combustion cycle. By means of a so-called variable turbine geometry, the turbine inlet cross-section of the nozzle channels running to the turbine wheel can be regulated and, thereby, the flow parameter of the turbine can be adjusted. The variable turbine geometry is usually formed by a ring of guide vanes which are rotatably mounted and, for example, reduce a cross-section which is free for the exhaust gas. Hereby, the exhaust gas velocity increases as well as the power available for driving the exhaust gas turbocharger, whereby the speed and the compressor pressure increase.

From DE 103 25 985 A1, a generic supercharger device is known which has a guide apparatus with a mounting ring and a contour sleeve. They are spaced apart from one another by spacers, wherein between the mounting ring and the contour sleeve, adjustable guide vanes are rotatably mounted. Here, the mounting ring is centered and supported by an annular flexible support element with respect to a housing of the supercharger device. For this, the support element is manufactured with a constant wall thickness by a non-cutting and/or cutting method, wherein in particular the supercharger device is to be manufactured in a more cost-effective manner.

From DE 10 2004 023 214 A1, a further generic supercharger device is known in which a vane mounting ring is configured as metal injection molding part or as investment casting. Hereby, in particular the amount of rework is to be minimized.

Further generic supercharger devices are known, for example, from DE 10 2004 044 703 A1, DE 10 2004 033 884 A1, DE 103 37 495 A1 and from U.S. Pat. No. 5,207,565.

SUMMARY

The present invention is concerned with the problem to provide an improved or at least a different embodiment for a generic supercharger device which can be manufactured in particular in a cost-effective manner and which, in addition, has a high reliability.

This problem is solved according to the invention by the subject matters of the independent claims. Advantageous embodiments are subject matter of the dependent claims.

The invention is based on the general idea to fasten a vane mounting ring, on which rotatably mounted guide vanes of a variable turbine geometry are provided, to an associated bearing housing of a supercharging device by means of a rivet connection. Such a rivet connection, which usually comprises two rivets, can be manufactured in a considerably more cost-effective manner than a comparable screw connection of the vane mounting ring on the bearing housing so that with the fastening method according to the invention, the manufacturing cost of the supercharger device can be reduced. Of course, it is also conceivable that the supercharger device according to the invention comprises a variable turbine geometry as well as variable compressor geometry. The use of at least two rivets to connect the vane mounting ring to the bearing housing of the supercharger device makes the use of screws dispensable which, compared to the rivets provided according to the invention, are more complicated to manufacture and thus more expensive. By the at least two rivets, a connection of very high quality is achieved because, in particular, a tightening torque as it must be considered for conventional screws, can be disregarded. Moreover, unintended loosening of the connection can be virtually ruled out.

According to another advantageous embodiment of the solution according to the invention, at least one spring device is provided which surrounds the rivet, thereby keeping the vane mounting ring spaced apart from the bearing housing. The spring load ensures a resilient mounting of the vane mounting ring with respect to the bearing housing, whereby each of them can adapt independently of one another to the respective occurring temperatures. By means of the resilient mounting of the vane mounting ring, thermal expansions occurring during the operation can thus be better absorbed, whereby it can be ensured that the supercharger device according to the invention functions properly at all occurring operational temperatures.

Advantageously, each rivet has a radial bead between a component forming a flow channel and the vane mounting ring, or carries a sleeve in this area, which sleeve defines a minimum distance between the component on the one hand, and the vane mounting ring on the other. By the radial bead or the sleeve arranged in this area between the vane mounting ring and the component forming the flow channel, it is ensured that a distance between the component and the vane mounting ring can not be shorter than a minimum distance, whereby the risk that the guide vanes which are arranged between the vane mounting ring and the component get jammed therebetween can be reliably prevented. For this purpose it is provided that the axial longitudinal extension of the radial bead or the sleeve is at least slightly greater than the axial longitudinal extension of the guide vanes so that the same are arranged in all possible operating states with at least slight clearance between the vane mounting ring and the component and thus are mounted in an easily rotatable manner.

In a further advantageous embodiment of the solution according to the invention, the at least two rivets have an at least approximately equal thermal expansion coefficient as the bearing housing, the component forming the flow channel, the guide vanes, and the vane mounting ring. Hereby it can be ensured that all mentioned components expand equally at a certain heating so that an impairment of the function due to differently strong expansion associated with, for example, a jamming of the guide vanes occurring at the same time can reliably be excluded.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures, schematically.

DETAILED DESCRIPTION

Figure 1:
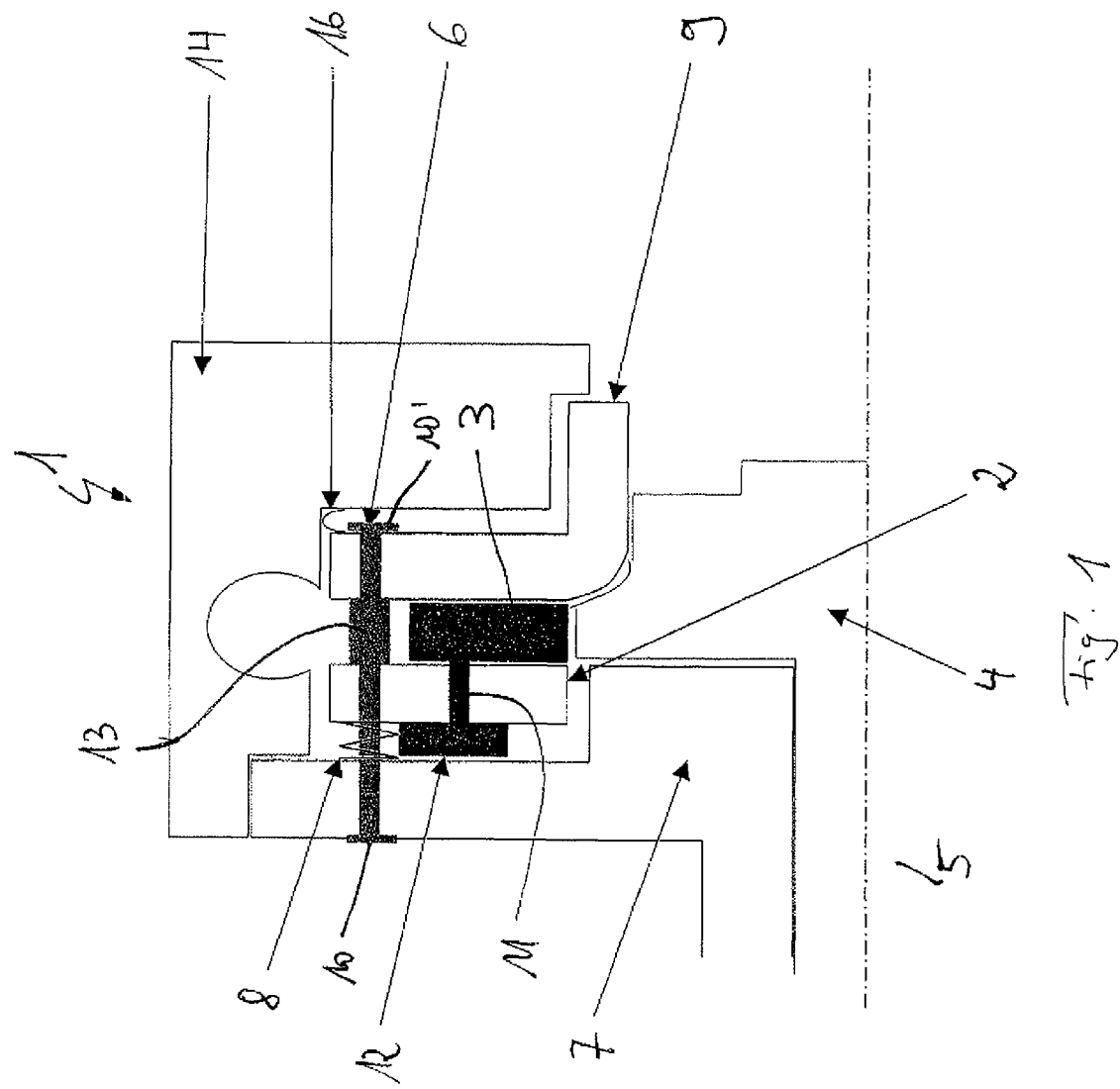
FIG. 1 shows a sectional view through a supercharger device according to the invention in the area of a vane mounting ring.

According to FIG. 1, a supercharger device 1 according to the invention, which can be configured, for example, as exhaust gas turbocharger for a motor vehicle, has a variable turbine geometry with a vane mounting ring 2. On the vane mounting ring 2, rotatably mounted guide vanes 3 are provided by means of which a flow cross-section can be varied, that is, influenced. Coaxial to the vane mounting ring 2, a shaft 5 carrying a turbine wheel 4 is provided, which shaft usually carries a non-shown compressor wheel on the side facing away from the turbine wheel 4. According to the invention, the vane mounting ring 2 is connected to the bearing housing 7 by at least two rivets 6. Preferably, a total of three rivets 6 are provided and uniformly distributed in circumferential direction for fastening the vane mounting ring 2 on the bearing housing 7 of the supercharger device 1.

Figure 2:
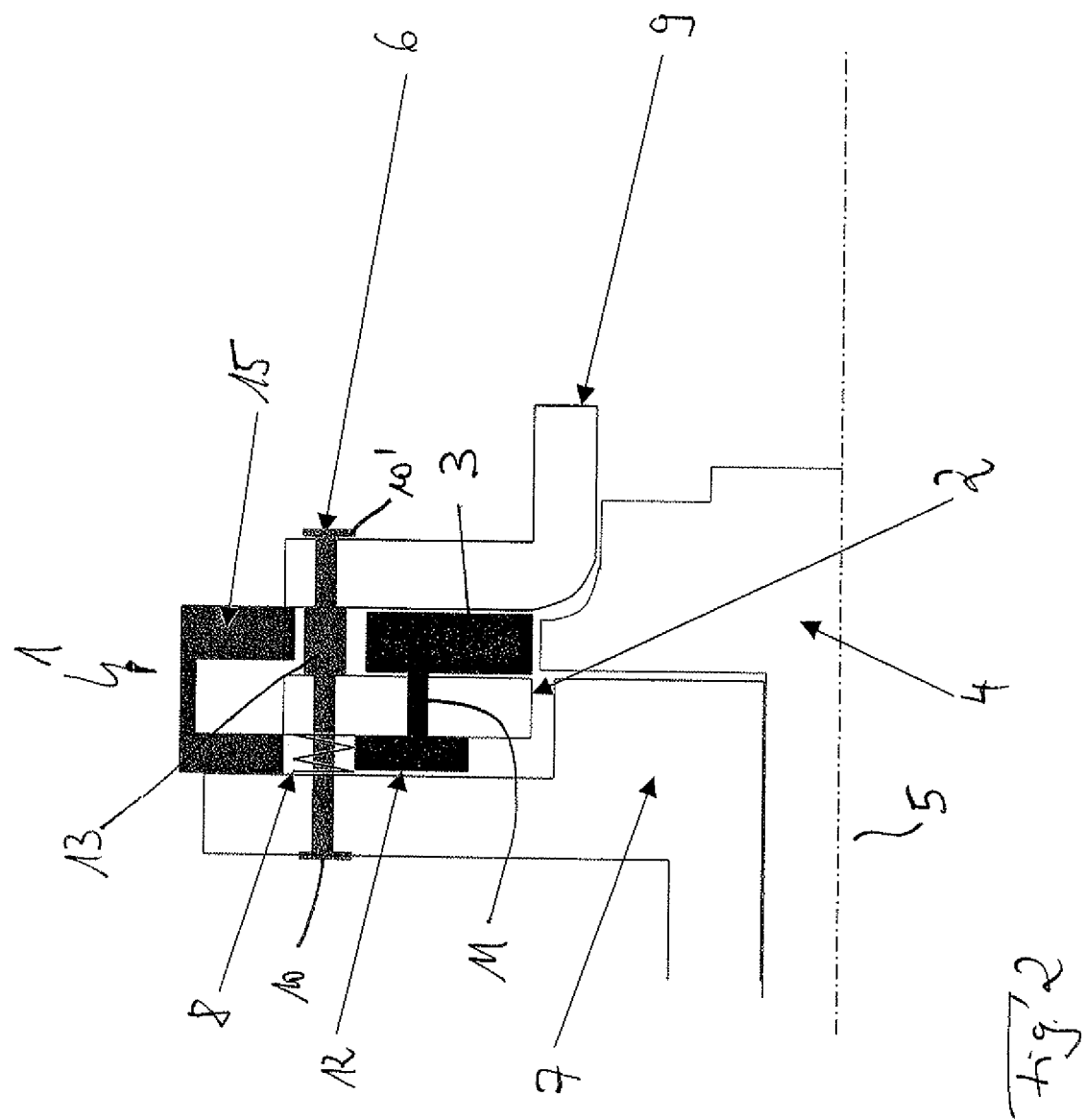
FIG. 2 shows an illustration as in FIG. 1 but without turbine housing and with an auxiliary riveting tool arranged for generating the rivet connection.

As is shown in the FIGS. 1 and 2, one of the rivets 6 has a spring device 8, in particular a spiral spring, which pretensions the vane mounting ring 2 away from the bearing housing 7 thereby resiliently mounting the vane mounting ring 2 with respect to the bearing housing 7. Of course, the spiral spring can also be configured as disk spring. It is important here that the spring device 8 is supported, on the one hand, on the vane mounting ring 2 and, on the other hand, on the bearing housing 7 thereby keeping the vane mounting ring 2 spaced apart from the bearing housing 7.

The vane mounting ring 2 is arranged axially between the bearing housing 7 and a component 9 forming a flow channel, wherein the at least two rivets 6 penetrate the bearing housing 7 and the component 9 and each of the rivets has on its end side one rivet head 10 and 10', which is supported on each of the component's 9 or the bearing housing's 7 side facing away from the vane mounting ring 2.

It is also shown in the FIGS. 1 and 2 that the shown rivet 6 has a radial bead 13 in the area between the component 9 and the vane mounting ring 2, which radial bead, for example, is configured as one piece with the rivet 6 or as additional sleeve and which ensures a minimum axial distance between the component 9 and the vane mounting ring 2. The bead 13 or the sleeve 13 has a slightly larger axial longitudinal extension than the guide vanes 3 so that a contact-free and thus non-jamming mounting of the guide vanes 3 in the intermediate space between the bearing housing 7 and the component 9 can be ensured at all times. The play between the guide vane 3 and the component 9 or the bearing housing 7 is dimensioned in such a manner that the guide vane's 3 mounting having the play is ensured in all possible operating states of the supercharger device 1 so that a jamming of the guide vanes 3 between the component 9 and the bearing housing 7 can not occur in any of the operating states. Hereby, a particularly high functional capability of the supercharger device 1 according to the invention is ensured.

If, in addition, the material selection is made in such a manner that the at least two rivets 6 have an approximately equal thermal expansion coefficient as the bearing housing 7, the component 9, the guide vanes 3, and the vane mounting ring 2, a non-jamming mounting of the guide vanes 3 can already be ensured through the material selection.

The guide vanes 3 penetrate the vane mounting ring 2 with a vane pin 11, wherein on the vane pin's 11 end facing away from the guide vane 3, a vane lever 12 is provided which usually interacts with a non-illustrated adjustment ring. Here, an axial longitudinal extension between the bead 13 or the sleeve 13 and the rivet head 10 is greater than a summed axial longitudinal extension of the bearing housing 7, vane lever 12, and vane mounting ring 2 so that also the vane lever 12 is arranged in all operating states with play in the intermediate space between the vane mounting ring 2 and the bearing housing 7.

By the rivet 6 provided according to the invention, a simplified assembly of the supercharger device 1 can be achieved because in particular a previously necessary screwing process and screws, which are complicated and thus costly to produce, can be eliminated. Furthermore, due to the resilient mounting of the vane mounting ring 2, thermal expansions can be absorbed much better, whereby in almost all possible operating temperatures, an extremely reliable operation of the supercharger device 1 can be ensured.

According to FIG. 2, instead of the turbine housing 14 arranged in FIG. 1, an auxiliary riveting tool 15 is provided which, when generating the rivet connection, fixes an axial distance between the bearing housing 7 and the vane mounting ring 2, as well as an axial distance between the vane mounting ring 2 and the component 9. By inserting the auxiliary riveting tool 15 having a U-shaped cross-section, the rivet heads 10 and 10' can be pressed or punched. The auxiliary rivet tool 15 is to be manufactured in an extremely simple and thus cost-effective manner. In FIG. 1, between the turbine housing 14 and the component 9, a seal 16 is arranged which is provided to prevent a bypass flow away from the turbine wheel 4.

The invention claimed is:

1. An exhaust gas supercharger, comprising:
   at least one of a variable turbine and a compressor;
   a vane mounting ring with at least one guide vane rotatably mounted thereon, wherein the vane mounting ring is connected to a supercharger bearing housing by at least two rivets; and
   at least one of a spiral spring and a disk spring positioned between the bearing housing and the vane mounting ring, the at least one of a spiral spring and a disk spring surrounding each associated rivet, wherein at least one spring pretensions the vane mounting ring away from the bearing housing.

2. The exhaust gas supercharger device according to claim 1 wherein the vane mounting ring is arranged axially between the bearing housing and a component forming a flow channel, wherein the at least two rivets penetrate the bearing housing and the component, and each of the rivets has on its end side one rivet head, which is supported on at least one of a component side and a bearing house side, wherein the side faces away from the vane mounting ring.

3. The exhaust gas supercharger device according to claim 2, further comprising: at least one of a radial bead and a sleeve positioned between the component and the vane mounting ring, wherein the at least one of radial bead and sleeve define a minimum distance between the component and the vane mounting ring.

4. The exhaust gas supercharger device according to claim 3, wherein at least one of the bead and sleeve has an at least slightly greater axial length than the guide vanes.

5. The exhaust gas supercharger device according to claim 1, wherein the vane mounting ring is connected to the bearing housing of the supercharger device by three rivets.

6. The exhaust gas supercharger device according to claim 1, wherein at least two rivets have an at least approximately equal thermal expansion coefficient as at least one of the bearing housing, the component, the guide vanes, and the vane mounting ring.

7. The exhaust gas supercharger device according to claim 1, wherein the vane mounting ring is arranged axially between the bearing housing and a component forming a flow channel, wherein the at least two rivets penetrate the bearing housing and the component, and each of the rivets has on its end side one rivet head, which is supported on at least one of a component side and a bearing house side, and wherein the side faces away from the vane mounting ring.

8. The exhaust gas supercharger device according to claim 1, further comprising: at least one of a radial bead and a sleeve positioned between the component and the vane mounting ring, and wherein the at least one of radial bead and sleeve define a minimum distance between the component and the vane mounting ring.

9. An internal combustion engine, comprising: a supercharger device, wherein the supercharger device has at least one of a variable turbine and a compressor;
the supercharger device has a vane mounting ring with at least one guide vane rotatably mounted thereon, wherein the vane mounting ring is connected to a supercharger bearing housing by at least two rivets; and
a spring separating device, which keeps the vane mounting ring spaced apart from the bearing housing and pretensions the vane mounting ring away from the bearing housing.

10. The internal combustion engine according to claim 9, wherein the spring separating device is a spiral spring.

11. The internal combustion engine according to claim 9, wherein the vane mounting ring is arranged axially between the bearing housing and a component forming a flow channel, wherein the at least two rivets penetrate the bearing housing and the component, and each of the rivets has on its end side one rivet head, which is supported on at least one of a component side and a bearing house side, and wherein the side faces away from the vane mounting ring.

12. The internal combustion engine according to claim 9, wherein the spring separating device is a disk spring that surrounds each associated rivet.

13. The internal combustion engine according to claim 9, further comprising: at least one of a radial bead and a sleeve positioned between the component and the vane mounting ring, wherein the at least one of radial bead and sleeve define a minimum distance between the component and the vane mounting ring.

14. The internal combustion engine according to claim 9, wherein at least one of the bead and sleeve has an at least slightly greater axial length than the guide vanes.

15. The internal combustion engine according to claim 9, wherein the vane mounting ring is connected to the bearing housing of the supercharger device by three rivets.

16. The internal combustion engine according to claim 9, wherein at least two rivets have an at least approximately equal thermal expansion coefficient as at least one of the bearing housing, the component, the guide vanes, and the vane mounting ring.

17. An exhaust gas supercharger, comprising:
at least one of a variable turbine and a compressor; and
a vane mounting ring with at least one guide vane rotatably mounted thereon, wherein the vane mounting ring is connected to a supercharger bearing housing by at least two rivets;
a separating device that keeps the vane mounting ring spaced apart from the bearing housing;
wherein the vane mounting ring is arranged axially between the bearing housing and a component forming a flow channel, wherein the at least two rivets penetrate the bearing housing and the component, and each of the rivets has on its end side one rivet head, which is supported on at least one of a component side and a bearing house side;
wherein the separating device permits the space between the vane mounting ring and bearing housing to vary and further comprising at least one sleeve positioned between the component and the vane mounting ring which defines a minimum distance between the component and the vane mounting ring.

18. An exhaust gas supercharger, comprising:
at least one of a variable turbine and a compressor; and
a vane mounting ring with at least one guide vane rotatably mounted thereon, wherein the vane mounting ring is connected to a supercharger bearing housing by at least two rivets;
a separating device that keeps the vane mounting ring spaced apart from the bearing housing;
wherein the vane mounting ring is arranged axially between the bearing housing and a component forming a flow channel, wherein the at least two rivets penetrate the bearing housing and the component, and each of the rivets has on its end side one rivet head, which is supported on at least one of a component side and a bearing house side,
wherein at least one spring positioned between the bearing housing and the vane mounting ring associated with each rivet, wherein the at least one spring pretensions the vane mounting ring away from the bearing housing.

* * * * *